United States Patent [19]
Schuhbauer

[11] 3,956,590
[45] May 11, 1976

[54] SWITCHING ARRANGEMENT FOR SWITCHING BETWEEN DIFFERENT CURRENT VALUES BY MEANS OF MECHANICAL OR ELECTRONIC SWITCHES

[75] Inventor: Ernst Schuhbauer, Munich, Germany

[73] Assignee: Siemens Aktiengesellschaft, Berlin & Munich, Germany

[22] Filed: Dec. 4, 1974

[21] Appl. No.: 529,497

[30] Foreign Application Priority Data
Dec. 4, 1973 Germany............................ 2360353

[52] U.S. Cl. ................................................ 178/74
[51] Int. Cl.² ......................................... H04L 11/14
[58] Field of Search................... 178/74, 75, 2 R, 3; 340/347 DA, 347 AD; 307/242, 239, 240, 241, 115

[56] References Cited
UNITED STATES PATENTS
| | | | |
|---|---|---|---|
| 3,665,460 | 5/1972 | Murakami et al............ | 340/347 DA |
| 3,699,568 | 10/1972 | Thompson et al. .......... | 340/347 DA |

*Primary Examiner*—Thomas A. Robinson

[57] ABSTRACT

Apparatus is described for switching between various current values in terminal equipment or remote units of data transmission systems using either mechanical or electronic switches. The connecting paths in a number of switches are connected in series between two current-carrying wires. Diodes polarized in the same direction are also connected between the wires and are interspersed in parallel between switch connecting paths.

4 Claims, 5 Drawing Figures

| S1 | 0 | 0 | 1 | 1 |
|---|---|---|---|---|
| S2 | 0 | 1 | 0 | 1 |
| I [mA] | 0 | 2 | 5 | 40 |

| S1 | 0 | 0 | 1 | 1 |
|---|---|---|---|---|
| S2 | 0 | 1 | 0 | 1 |
| I [mA] | 0 | 2 | 5 | 40 |

| S1 | 0 | 0 | 1 | 1 |
|---|---|---|---|---|
| S2 | 0 | 1 | 0 | 1 |
| B | 0 | 1 | 1 | 0 |

SWITCHING ARRANGEMENT FOR SWITCHING BETWEEN DIFFERENT CURRENT VALUES BY MEANS OF MECHANICAL OR ELECTRONIC SWITCHES

BACKGROUND OF THE INVENTION

This invention relates to a circuit arrangement for switching between different current values by means of mechanical or electronic switches, more particularly in terminal equipment and remote control units of teletypewriter and data transmission systems connected to exchanges over single-current lines.

If the subscribers in teletypewriter and data transmission systems are connected to exchanges over single-current lines, it is necessary to switch the teletypewriter and terminal equipment between four different current values, e.g., the current values 0 mA, 2 mA, 5 mA, and 40 mA. As generally known, the values 0 mA and 40 mA are assigned to the call-connection condition, the value 5 mA to the idle condition, and the value 2 mA to the connection-release condition.

The switching referenced above heretofore occurred by means of three mechanical switches. FIG. 1 shows such a circuit arrangement in which on the left-hand side the terminal equipment is shown schematically with the remote control unit, in the middle the line L, and on the right-hand side the exchange V having the polarity-reversing means.

The current value 40 mA can be set by means of the switch K1, and the current value 5 mA or 2 mA by means of the switches K2, K3.

In the electronic circuits for remote control units proposed heretofore, the mechanical switches have not simply been replaced by electronic switches, because the necessary expense appeared excessive. Not only three electronic switches (e.g. transistors) are necessary, but three additional coupling circuits must be used, because of the resistive decoupling required in most cases. For this reason, in prior art electronic circuits, no distinction was made either between the current values 5 and 2 mA or 2 and 0 mA, or the two values were assigned to the different polarity of the line during the call setup and the clearing of a connection. Such an arrangement is shown in FIG. 2. In the Figure one of the resistors of the branch controlled by switch S2 is bridged by a diode, so that a current value of 5 mA results in one direction of current flow and a current value of 2 mA in the other direction of current flow. In this arrangement, only two electronic switches are required. However, since the electronic switches are polarity-dependent, both switches must, for example, be switched into the diagonal of a bridge rectifier.

These two solutions applied to electronic circuits of known construction have operational disadvantages. Thus, for example, the lack of significant distinction between 0 mA and 2 mA leads to distortions during the transmission of the teletypewriter signals; the lack of significant distinction between 2 and 5 mA leads to limited reliability in the case of a connection release. However, if the two values are assigned to the different polarities of the line during call setup and connection clearing, call cancellation during the call setup is in certain circumstances impossible, because during the call setup the polarity of the line that prevails during the idle condition is still available. To avoid these drawbacks, all occurring current values should be adjustable. However, also the number of required switches should be held to a minimum.

An object of the invention, therefore, is to provide a means for switching between different current values with a minimum number of switches using either mechanical or electronic switches, while avoiding operational disadvantages.

SUMMARY OF THE INVENTION

In accordance with the invention, the foregoing and other objects are achieved in that the breaks between contacts of $n$ switches, or in the case of electronic switches the connecting paths thereof, are connected in series between the two wires of the current-carrying line and a diode is connected between every two breaks. All of the diodes are polarized in the same direction. One of the poles of each diode is connected over a resistor to one of the two wires of the current-carrying line, and the other pole of each diode is connected over a resistor to the other wire of the current-carrying line.

Thus, the invention enables the switching between $2^n$ different current values with only $n$ switches ($2^n$ different switching combinations are possible with $n$ switches), if the polarity of the voltage is not reversed at the input of the circuit. The additional expense in the case of $n$ switches consists of ($n-1$) diodes.

The entire circuit arrangement is polarity-dependent because of the polarity dependency of the diodes. If the polarity of the voltage is reversed, $2^n$ additional current values can be set by means of mechanical switches or polarity-independent electronic switches. Thus, by means of $n$ mechanical switches a total of $2^{(n+1)}$ current values can be set. If, however, polarity-dependent electronic switches are employed, only one additional current value can be set, when the polarity of the voltage is reversed. Thus, one can switch between ($2^n+1$) different current values in all.

In an advantageous development of the invention using polarity-dependent electronic switches, all the connecting paths are polarized in the same direction as the diodes. As a consequence, even the current value "zero" and the maximum current value resulting from the bypassing of all the resistors of the circuit can be set.

If the circuit is employed in the terminal equipment or remote control units of teletypewriter and data transmission systems, it is useful to take measures against polarity dependency. The circuit is then, for example, switched into one diagonal of a bridge rectifier, in the other diagonal of which the subscriber line is disposed. In this case, it is of advantage to select the polarity in the bridge in such a manner that both the current value zero and the maximum current value are adjustable.

Frequently, it is necessary to jointly weight a part of the adjustable current values. This can best be achieved by switching a weighting network into a wire of the current-carrying line which, in dependence upon the condition of the switch, can be bridged by the emitter-to-collector junction of a transistor.

BRIEF DESCRIPTION OF THE DRAWINGS

The principles of the invention will be more readily understood by reference to the description of preferred embodiments given hereinbelow in conjunction with the accompanying drawings, wherein.

DETAILED DESCRIPTION OF THE DRAWINGS

Figure 1:
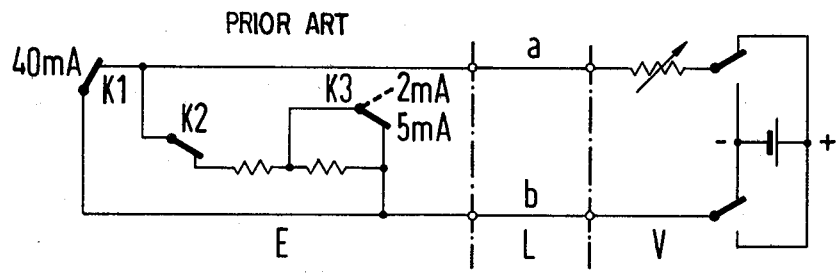
FIG. 1 is a schematic diagram illustrating prior art mechanical current switching apparatus as used in terminal equipment.
Figure 2:
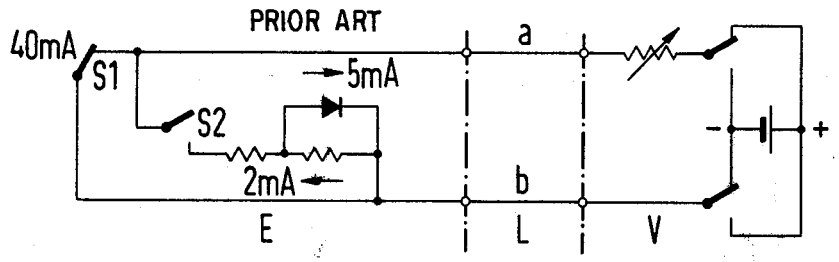
FIG. 2 is a schematic diagram of prior art electronic current switching apparatus as used in remote control units.
Figure 3:
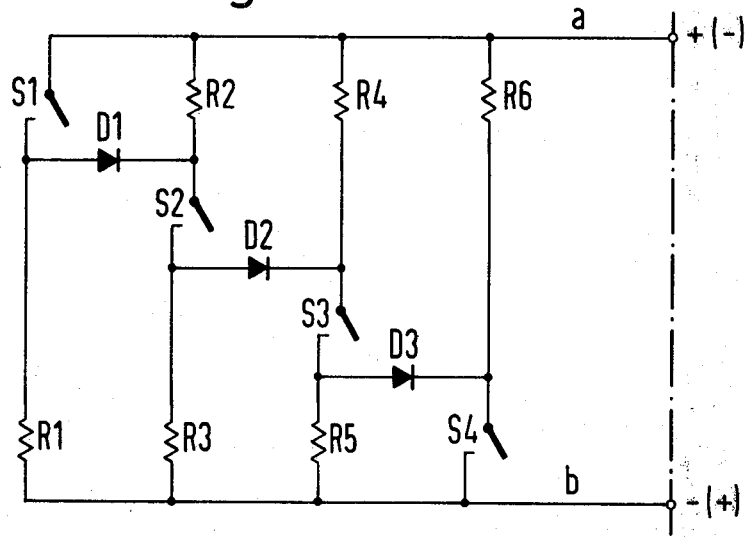
FIG. 3 is a schematic diagram of a preferred embodiment of a circuit arrangement according to the invention for switching between 32 or 17 different current values by means of four mechanical or electronic switches.

In FIG. 3 the current is fed over wires $a$ and $b$ of the current-carrying line to the circuit shown in FIG. 3 for switching between $2^{(4+1)} = 32$ or $2^4 + 1 = 17$ different current values. The break or connecting path of switch S1, diode D1, the break of switch S2, diode D2, the break of switch S3, diode D3, and the break of switch S4 are connected in series between the wires $a$ and $b$. The positive poles of the diodes D1, D2 and D3 polarized in the conducting direction are connected to the wire $b$ over the resistors R1, R3 and R5, respectively, while the negative poles of the diodes D1, D2, and D3 are connected to the wire $a$ over the resistors R2, R4 and R6, respectively. A total of $2^4 = 16$ different switch combinations can be set by means of the four switches S1 to S4.

Let it be assumed that the switches S1 to S4 are polarity-independent switches. If the wire $a$ is positive, $2^4 = 16$ different current values can be set, including the value zero (all the switches are open) and the maximum value (all the switches are closed). If the wire $b$ is positive, likewise, $2^4 = 16$ current values can be set that are distinguished from the values that can be set in the case of reversed polarity. However, in that case one cannot switch to the value zero and to the maximum current value.

If the switches S1 to S4 are polarity-dependent switches, the connecting paths thereof are polarized in the same direction as the diodes, so that if the wire $a$ is positive, the series connection of all the breaks and breaks the diodes is conductive if all the breaks are open. If the wire $a$ lies on positive polarity, $2^4 = 16$ current values can be set. If all the switches are open, no current flows through the line, but if all the switches are closed, the maximum current flows over the series connection of all the connecting paths and all the diodes. If the polarities of the wires $a$ and $b$ are reversed, the switches S1 to S4 are impervious to current, and current flows occur in the reverse direction, the magnitude thereof being determined by the parallel connection of the resistors R1 + R2, R3 + R4, and R5 + R6.

Figure 4:
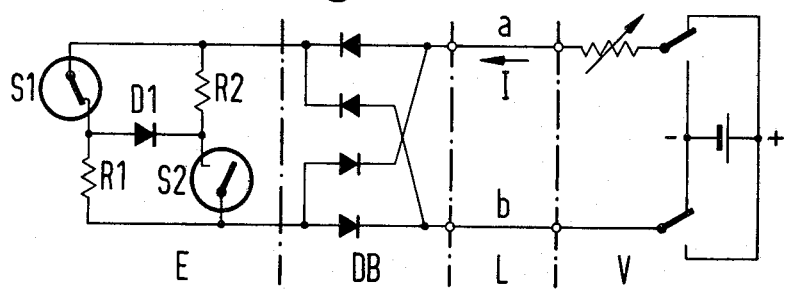
FIG. 4 is a schematic diagram of a preferred embodiment of a complete termination circuit for use in teletypewriter and data transmission with switching between four different current values.

FIG. 4 shows a complete termination circuit with switching between four different current values, for example, by means of polarity-dependent switches. Current is fed to the terminal unit E from the exchange V, over the polarity-reversing means provided therein, line L and bridge rectifier DB. Depending on the conditions of the connecting paths of the electronic switches S1 and S2, for the resistive coupling of which only two coupling circuits are required, one obtains the current values shown in the table of FIG. 4, where the conductive condition of a break is labeled 1 and the non-conductive state 0. Thus, by means of the two electronic switches S1 and S2, the current values 0, 2, 5 and 40 mA can be set. The weighting of the individual currents takes place in appropriate circuits.

Figure 5:
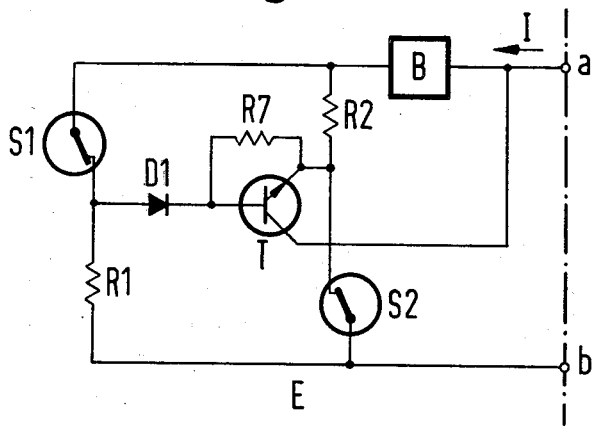
FIG. 5 is a schematic diagram of a circuit arrangement for jointly weighting two of four different current values in the FIG. 4 embodiment.

FIG. 5 shows a circuit arrangement for the common weighting of the current values 2 and 5 mA among the four adjustable current values of FIG. 4. The common weighting can be carried out by means of a simple auxiliary unit in the terminal equipment or in the remote control unit E. A weighting network B is switched into the wire $a$, the inlet of the weighting network being connected to the collector of an NPN transistor T. The emitter of the transistor is connected to the common point between resistor R2 and the connecting path of electronic switch S2. The negative pole of the diode D1 is connected to the base of the transistor. The base and emitter of the transistor are, likewise, connected to one another via a resistor R7. If both connecting paths are blocked or conductive, the weighting network B does not respond, because in one case the current $I = 0$, and in the other the current is conducted via the conductive transistor T and the break of the electronic switch S2. In this case, the weighting network B is bypassed. In the two other cases the path of the currents does not change with respect to the circuit of the terminal unit E shown in FIG. 4. The weighting network B is thus energized by the currents with the values 2 and 5 mA and responds. In the table of FIG. 5, the response of the weighting network B is labeled 1.

The principles of the invention are described hereinabove by means of descriptions of two preferred embodiments. The described embodiments are to be considered only as being exemplary, and it is contemplated that changes or modifications to them can be made while remaining within the scope of the invention, as defined by the appended claims.

I claim:

1. Apparatus for selectively switching between various current values in terminal equipment or remote units connected by single current lines to exchanges of data transmission systems using either mechanical or electronic switches, comprising:

a pair of current carrying wires connecting said terminal unit or remote unit to said exchange, a predetermined number of switches connected so that the connecting paths thereof are connected in series between said wires, a plurality of diodes polarized in the same direction, one of which forms a series connection between each adjacent pair of said switch connecting paths, and a plurality of resistors, a junction point between a said diode and a said switch being connected to a said wire by a said resistor, like poles of said diodes being connected to a wire of like polarity.

2. The apparatus defined in claim 1 wherein said switches are electronic switches and wherein all of said switch connecting paths are polarized in the same direction.

3. The apparatus defined in claim 2 further comprising:

a diode bridge polarized so that both the current value zero and the maximum current value are adjustable, one diagonal of said diode bridge being connected across said pair of wires, the other diagonal of said diode bridge being connected across said series connection of switches.

4. The apparatus defined in claim 3 further comprising:
  weighting network means connected in series in one of said wires for the common weighting of a portion of the adjustable current values and
  a transistor having the conducting path thereof connected in parallel to said weighting network means connected to be rendered conductive in dependence on the condition of said switches.

* * * * *